United States Patent

[11] 3,583,593

[72] Inventor Elmer V. Merritt
 Newport News, Va.
[21] Appl. No. 860,241
[22] Filed Sept. 23, 1969
[45] Patented June 8, 1971
[73] Assignee The United States of America as
 represented by the Secretary of the Army

[54] VARIABLE LEVEL COAGULANT RESERVOIR
 FOR SELF-SEALING FUEL TANKS
 5 Claims, 4 Drawing Figs.

[52] U.S. Cl. .................................................... 220/9R,
 220/63A
[51] Int. Cl. ...................................................... B65d 25/18
[50] Field of Search ........................................... 220/13, 63
 A, 85 B, 88 R, 88 B, 63, 71, 3, 1, 15

[56] References Cited
 UNITED STATES PATENTS
1,184,620  5/1916  Bruun .......................... 220/13

| | | | |
|---|---|---|---|
| 1,911,608 | 5/1933 | Davis et al. ................. | 220/63 |
| 2,844,269 | 7/1958 | Durbin ......................... | 220/63X |
| 2,924,350 | 2/1960 | Greer .......................... | 220/18X |
| 3,282,459 | 11/1966 | Wilson ........................ | 220/3 |
| 3,291,333 | 12/1966 | House ......................... | 220/15 |

Primary Examiner—Joseph R. LeClair
Assistant Examiner—James R. Garrett
Attorneys—Harry M. Saragovitz, Edward J. Kelly and Herbert Berl ABSTRACT: An aircraft fuel tank of the self-sealing type wherein a coagulant reservoir is located near the floor of the tank. The reservoir is in fluid communication with the space between the tank walls and the weight of the fuel pressurizes the reservoir to force the coagulant to approximately the same level in the space as the fuel in the tank which results in sealing when the walls are penetrated below coagulant level and no less thereof when the walls are penetrated above the level.

PATENTED JUN 8 1971 3,583,593

INVENTOR,
Elmer V. Merritt

BY: Harry M. Saragovitz,
Edward J. Kelly &
Herbert Berl   ATTORNEYS.

VARIABLE LEVEL COAGULANT RESERVOIR FOR SELF-SEALING FUEL TANKS

The invention described herein may be manufactured, used, and licensed by or for the Government for governmental purposes without the payment to me of any royalty thereon.

The present invention relates to a variable level coagulant reservoir for self-sealing fuel tanks and more particularly to a tank in which the level of the coagulant equals the level of fuel in the tank.

The present design of aircraft fuel tanks employing a liquid coagulant to effect sealing of holes resulting from penetration of the tank walls by bullets, etc., utilize a coagulant reservoir fixed to the upper surface of the tank. The coagulant flows from the reservoir under force of gravity to fill the walls. Additional coagulant is contained in the reservoir to ensure adequate supply for sealing. This system was satisfactory if all penetrations occurred below the fuel level. When penetration occurred above the fuel level, all coagulant above the penetration was lost. Excessive amounts of coagulant flowed into the tank and into the fuel causing undesirable and hazardous conditions due to clogging of fuel pump inlets, lines, etc., and damage to the engine from burning the contaminated fuel.

The present invention eliminates the aforesaid hazards by placing the coagulant reservoir in the lower part of the tank and close to the floor thereof. The reservoir is made of a material which will permit the weight of the fuel to act on the reservoir to force the coagulant into the walls of the tank and assume approximately the same level as the fuel in the tank. Thus, if a bullet penetrated the tank above the fuel level, little harm is done, and if below the level, sealing action will occur at once.

It is therefore a principal object of this invention to provide a coagulant reservoir system for a self-sealing fuel tank in which the weight of the fuel in the tank will act on the reservoir to maintain the coagulant at the same level as the fuel.

IN THE DRAWING

Figure 1:
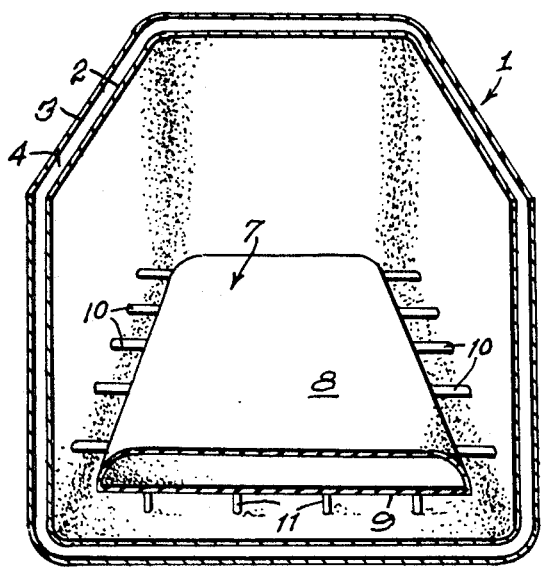
FIG. 1 is a somewhat schematic perspective view of a self-sealing fuel tank and being cut out to show the construction of the coagulant reservoir of the invention.
Figure 3:
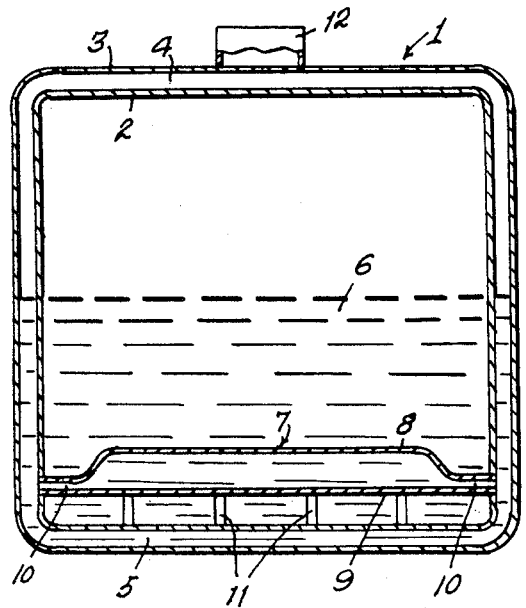
FIG. 3 is a similar view of a partly filled tank.
Figure 4:
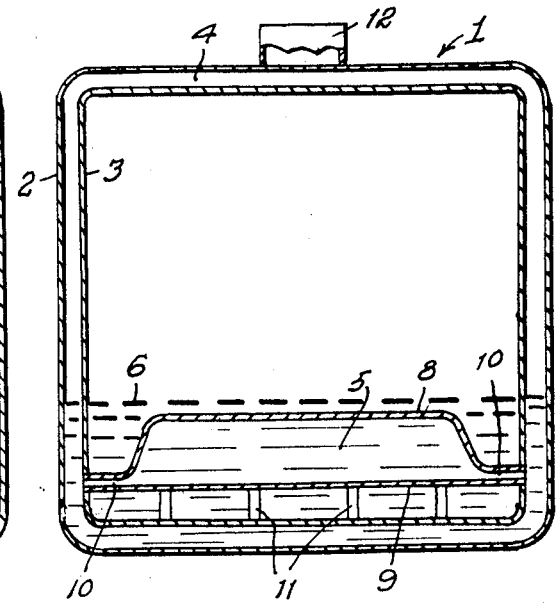
FIG. 4 is a similar view showing the fuel at low level.

Referring in detail to the drawing wherein like reference numerals designate like parts throughout the several views, FIG. 1 is a somewhat schematic cutaway view of a self-sealing fuel tank which is indicated generally by 1. Tank 1 is composed of an inner wall 2 and another wall 3 which are spaced to provide a space 4 between them, as shown. This space 4 is for the purpose of containing a coagulant 5, see FIGS. 2—4. The inner wall 2 contains the fuel 6. The material of which the tank 1 is constructed forms no part of this invention, but it will, of course, be of the usual material which is used for self-sealing in case of penetration by a bullet, etc. An example of double wall sealing and a coagulant may be found in U.S. Pat. No. 3,291,333.

The coagulant reservoir, indicated generally by 7 and is located in the lower portion of tank 1 as shown best in FIG. 1. Inner wall 2 and outer wall 3 will be connected by means such as spacers, not shown, or by any other means which are currently used. Reservoir 7 will be made of a flexible material that is capable of expansion or contraction. The construction shown in the drawing is purely schematic and is shown by way of example only. As shown, reservoir 7 comprises flat top and bottom walls 8 and 9 which form an elongated enclosure.

A series of spaced flow tubes 10 extend from the sides of reservoir 7 and are in fluid connection with Space 4 of the tank. Reservoir 7 is supported somewhat above the floor of tank 1 by spacer legs 11.

A vacuum/pressure chamber 12 is located on the upper surface of tank 1 and is connected to space 4 to permit adjusting of the coagulant level if required.

OPERATION

Space 4 is filled with a coagulant 5 through chamber 12 and into reservoir 7 until it rises to a level equal to the level of fuel 6 in tank 1.

Figure 2:
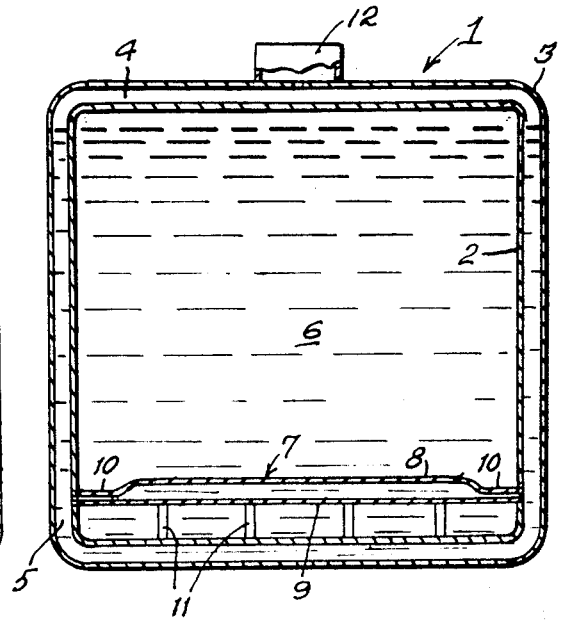
FIG. 2 is a cross section of the fuel tank being substantially filled with fuel.

As shown in FIG. 2, the tank 1 is substantially filled and the pressure of fuel 5 pushes down on top wall 8 of reservoir 7 and maintains the coagulant level. As the fuel 6 is used, its level drops and the resultant loss in weight relieves pressure on top wall 8 of reservoir 7 which will then expand and permit coagulant 5 to enter thereinto. Thus as more fuel 6 is used, more coagulant 5 will flow into reservoir 7 and when properly adjusted, the coagulant level will always equal the fuel level.

The coagulant level may be adjusted by vacuum or pressure in chamber 12 if needed.

It is obvious that when a bullet pierces the tank wall below the fuel level of the tank, that there will always be coagulant to seal the hole.

If the tank wall is penetrated above the fuel level, there will be no loss of coagulant nor entry thereof into the fuel since there will be no coagulant in space 4 above the fuel level.

While only a preferred form of the invention is shown and described, numerous changes and modifications may be made therein without departing from the spirit of the invention as set forth in the appended claims:

I claim:

1. In combination with a self-sealing fuel tank having spaced inner and outer walls, a coagulant reservoir located in the lower portion of said fuel tank comprising an expansible enclosure, means providing fluid connection of said enclosure with the space between said inner and outer walls of said tank whereby when said reservoir is filled with a coagulant and said tank contains a fuel, the pressure of said fuel on said reservoir will force the level of said coagulant to rise to a level equal to the level of said fuel in said tank and when the level of fuel falls in said tank said reservoir will expand to accommodate said coagulant and lower the level of said coagulant in said space, and means supporting said reservoir in said tank.

2. A device as set froth in claim 1 wherein said reservoir comprises an elongated, flexible bladder having a flat upper wall.

3. A device as set froth in claim 1 wherein said means for the fluid connection of said reservoir with said space between said inner and outer walls of said tank comprises a series of longitudinally spaced tubes extending from the sides of said reservoir and being in communication with said space.

4. A device as set forth in claim 1 wherein said reservoir, said means supporting said reservoir in said tank and said means for the fluid connection of said reservoir with said space are integral with the inner wall of said tank.

5. A device as set forth in claim 1 wherein said means for supporting said reservoir in said tank comprises a series of spacer legs connected to the lower wall of said reservoir and the lower inner wall of said tank whereby said reservoir is spaced a distance above the lower inner wall.